United States Patent Office 3,013,986
Patented Dec. 19, 1961

3,013,986
METAL-LOADED MOLECULAR SIEVES
Charles R. Castor, Indianapolis, Ind., assignor to Union Carbide Corporation, a corporation of New York
No Drawing. Filed Sept. 24, 1958, Ser. No. 762,957
12 Claims. (Cl. 252—455)

This invention relates to metal-loaded zeolitic molecular sieves and to a process for preparing these materials.

The use of metals as catalysts, scavengers, and getters in a number of chemical reactions and chemical systems is well known in the chemical art. The effectiveness of the metal in such cases has been found to depend, to a considerable degree, on the form in which the metal is present in the reaction zone.

It is an object of this invention to provide a process for introducing alkali metals into the internal adsorption area of zeolitic molecular sieves.

It is another object of the invention to provide an alkali metal-loaded zeolitic molecular sieve which is a superior catalyst, scavenger and getter having a higher specific surface of metal for chemesorption and having a corresponding higher surface activity.

Other objects will be apparent from the subsequent disclosure and appended claims.

The process which satisfies the objects of the present invention comprises intimately contacting, in an inert atmosphere, an activated zeolitic molecular sieve with a vapor of an alkali metal whereby at least a substantial quantity of the metal vapor is adsorbed by the molecular sieve, and cooling said metal-containing zeolitic molecular sieve in an inert atmosphere. The product so obtained contains the alkali metal in a form having a high specific surface which is suitable for chemesorption and catalysis, scavenging, and gettering.

Zeolitic molecular sieves, both natural and synthetic, are metal-aluminosilicates. The crystalline structure of these materials is such that a relatively large adsorption area is present inside each crystal. Access to this area may be had by way of openings, or pores, in the crystal. Molecules are selectively adsorbed by molecular sieves on the basis of their size and polarity, among other things.

Zeolitic molecular sieves consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example metal ions, ammonium ions, amine complexes, or hydrogen ions. The spaces between the tetrahedra may be occupied by water or other adsorbate molecules.

The zeolites may be activated by driving off substantially all of the water of hydration. The space remaining in the crystals after activation is available for adsorption of adsorbate molecules. Any of this space not occupied by the adsorbed alkali metal atoms will be available for adsorption of molecules having a size, shape, and energy which permits entry of the adsorbate molecules into the pores of the molecular sieves.

The zeolitic molecular sieves to be useful in the present invention, must be capable of adsorbing oxygen molecules at the normal boiling point of oxygen. Included among these are the preferred natural zeolitic molecular sieves, chabazite, faujasite, erionite, mordenite, gmelinite, and the calcium form of analcite, and the preferred synthetic zeolitic molecular sieves, zeolite A, D, L, R, S, T, X and Y. The natural materials are adequately described in the chemical art. The characteristics of the synthetic materials and processes for making them are provided below.

The general formula for zeolite X, expressed in terms of mol fractions of oxides, is as follows:

$$0.9 \pm 0.2 M_{\frac{2}{n}} O : Al_2O_3 : 2.5 \pm 0.5 SiO_2 : 0 \text{ to } 8H_2O$$

In the formula "M" represents a cation, for example hydrogen or a metal, and "$n$" its valence. The zeolite is activated or made capable of adsorbing certain molecules by the removal of water from the crystal as by heating. Thus the actual number of mols of water present in the crystal will depend upon the degree of dehydration or activation of the crystal. Heating to temperatures of about 350° C. has been found sufficient to remove substantially all of the adsorbed water.

The cation represented in the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is $$0.9Na_2O : Al_2O_3 : 2.5SiO_2 : 6.1H_2O$$

The major lines in the X-ray diffraction pattern of zeolite X are set forth in Table A below:

TABLE A

| $d$ Value of Reflection in A. | $100 \, I/I_0$ |
|---|---|
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the K$\alpha$ doublet of copper, and a Gieger counter spectrometer with a strip chart pen recorder was used. The peak heights, I, and the positions as a function of $2\theta$, where $\theta$ is the Bragg angle, were read from the spectrometer charge. From these, the relative intensities, $$\frac{100 I}{I_0}$$

where $I_0$ is the intensity of the strongest line or peak, and $d$(obs), the interplanar spacing in A., corresponding to the recorded lines were calculated. The X-ray patterns indicate a cubic unit cell of dimensions between 24.5 A. and 25.5 A.

To make sodium zeolite X, reactants are mixed in aqueous solution and held at about 100° C. until the crystals of zeolite X are formed. Preferably the reactants should be such that in the solution the following ratios prevail:

$SiO_2/Al_2O_3$ ---------------------------- 3–5
$Na_2O/SiO_2$ ---------------------------- 1.2–1.5
$H_2O/Na_2O$ ---------------------------- 35–60

The general formula for zeolite A, expressed in terms of mol fractions of oxides is as follows:

$$1.0 \pm 0.2 M_{\frac{2}{n}} O : Al_2O_3 : 1.85 \pm 0.5 SiO_2 : yH_2O$$

In the formula, "M" represents a metal and "$n$" its valence, and "Y" may be any value up to 6. The zeolite is activated, or made capable of adsorbing certain molecules by the removal of water from the crystal, as by heating. Thus the actual number of mols of water present in the crystal will depend upon the degree of dehydration or activation of the crystal.

As in the case of zeolite X, the metal represented in the formula by the letter "M" can be changed by conventional ion-exchange techniques. For purposes of convenience the sodium form of zeolite A, designated sodium zeolite A, is synthesized and other forms obtained by the modification of the sodium zeolite A.

A typical formula for sodium zeolite A is $$0.99Na_2O:1.0Al_2O_3:1.85SiO_2:5.1H_2O$$

The major lines in the X-ray diffraction pattern of zeolite A are set forth in Table B below:

TABLE B

| d Value of Reflection in A. | 100 I/I₀ |
|---|---|
| 12.2±0.2 | 100 |
| 8.6±0.2 | 69 |
| 7.05±0.15 | 35 |
| 4.07±0.08 | 36 |
| 3.68±0.07 | 53 |
| 3.38±0.06 | 16 |
| 3.26±0.05 | 47 |
| 2.96±0.05 | 55 |
| 2.73±0.05 | 12 |
| 2.60±0.05 | 22 |

The same procedures and techniques were employed in obtaining the patterns described in Tables A and B.

To make sodium zeolite A, reactants are mixed in aqueous solution and heated at about 100° C. until the crystals of zeolite A are formed. Preferably the reactants should be such that in the solution the following ratios prevail:

$SiO_2/Al_2O_3$ _____ 0.5–1.3
$Na_2O/SiO_2$ _____ 1.0–3.0
$H_2O/Na_2O$ _____ 35–200

The chemical formula for zeolite Y expressed in terms of oxides mole ratios may be written as $$0.9\pm0.2Na_2O:Al_2O_3:WSiO_2:XH_2O$$

wherein "W" is a value greater than 3 up to about 5 and "X" may be a value up to about 9.

Zeolite Y has a characteristic X-ray powder diffraction pattern which may be employed to identify zeolite Y. The X-ray powder diffraction data are shown in Table C. The values for the interplanar spacing, d, are expressed in angstrom units. The relative intensity of the lines of the X-ray powder diffraction data are expressed as VS, very strong; S, strong; M, medium; W, weak; and VW, very weak.

TABLE C

| hkl | h²+k²+l² | d in A. | Intensity |
|---|---|---|---|
| 111 | 3 | 14.3–14.4 | VS |
| 220 | 8 | 8.73–8.80 | M |
| 311 | 11 | 7.45–7.50 | M |
| 331 | 19 | 5.67–5.71 | S |
| 333, 511 | 27 | 4.75–5.08 | M |
| 440 | 32 | 4.37–4.79 | M |
| 620 | 40 | 3.90–4.46 | W |
| 533 | 43 | 3.77–3.93 | S |
| 444 | 48 | 3.57–3.79 | VW |
| 551, 711 | 51 | 3.46–3.48 | VW |
| 642 | 56 | 3.30–3.33 | S |
| 553, 731 | 59 | 3.22–3.24 | W |
| 733 | 67 | 3.02–3.04 | M |
| 660, 822 | 72 | 2.91–2.93 | M |
| 555, 751 | 75 | 2.85–2.87 | S |
| 840 | 80 | 2.76–2.78 | M |
| 753, 911 | 83 | 2.71–2.73 | W |
| 664 | 88 | 2.63–2.65 | M |
| 931 | 91 | 2.59–2.61 | M |
| 844 | 96 | 2.52–2.54 | VW |
| 862; 10, 2, 0 | 104 | 2.42–2.44 | VW |
| 666; 10, 2, 2 | 108 | 2.38–2.39 | M |
| 775; 11, 1, 1 | 123 | 2.22–2.24 | VW |
| 880 | 128 | 2.18–2.20 | W |
| 955; 971; 11, 3, 1 | 131 | 2.16–2.18 | VW |
| 973; 11, 3, 3 | 139 | 2.10–2.11 | W |
| 884; 12, 0, 0 | 144 | 2.06–2.07 | VW |
| 886; 10, 8, 0; 12, 4, 2 | 164 | 1.93–1.94 | VW |
| 10, 8, 2 | 168 | 1.91–1.92 | VW |
| 995; 13, 3, 3 | 187 | 1.81–1.82 | VW |
| 11, 7, 5; 13, 5, 1 | 195 | 1.77–1.78 | VW |
| 10, 8, 6; 10, 10, 0; 14, 2, 0 | 200 | 1.76–1.78 | W |
| 997; 11, 9, 3 | 211 | 1.70–1.71 | W |

When an aqueous colloidal silica sol employed as the major source of silica, zeolite Y may be prepared by preparing an aqueous sodium aluminosilicate mixture having a composition, expressed in terms of oxide-mole-ratios, which falls within one of the following ranges:

|  | Range 1 | Range 2 | Range 3 |
|---|---|---|---|
| Na₂O/SiO₂ | 0.20 to 0.40 | 0.41 to 0.61 | 0.61 to 0.80 |
| SiO₂/Al₂O₃ | 10 to 40 | 10 to 30 | 7 to 30 |
| H₂O/Na₂O | 25 to 60 | 20 to 60 | 20 to 60 | maintaining the mixture at a temperature of about 100° C. until crystals are formed, and separating the crystals from the mother liquor.

When sodium silicate is employed as the major source of silica, zeolite Y may be prepared by preparing an aqueous sodium aluminosilicate mixture having a composition, expressed in terms of oxide-mole-ratios, falling within one of the following ranges:

|  | Range 1 | Range 2 | Range 3 |
|---|---|---|---|
| Na₂O/SiO₂ | 0.6 to 1.0 | 1.5 to 1.7 | 1.9 to 2.1 |
| SiO₂/Al₂O₃ | 8 to 30 | 10 to 30 | about 10 |
| H₂O/Na₂O | 12 to 90 | 20 to 90 | 40 to 90 | maintaining the mixture at a temperature of about 100° C. until crystals are formed, and separating the crystals from the mother liquor.

The composition of zeolite L, expressed in terms of mole ratios of oxides, may be represented as follows:

$$1.0\pm0.1\frac{M}{n}{}_2O:Al_2O_3:6.4\pm0.5SiO_2:yH_2O$$

wherein "M" designates a metal, "n" represents the valence of "M"; and "y" may be any value from 0 to about 7.

The more significant d (A.) values, i.e., interplanar spacings, for the major lines in the X-ray diffraction pattern of zeolite L, are given below in Table D.

TABLE D

| 16.1 ±0.3 | 3.17±0.01 |
| 7.52±0.04 | 3.07±0.01 |
| 6.00±0.02 | 2.91±0.01 |
| 4.57±0.03 | 2.65±0.01 |
| 4.35±0.04 | 2.46±0.01 |
| 3.91±0.02 | 2.42±0.01 |
| 3.47±0.02 | 2.19±0.01 |
| 3.28±0.02 | |

Although there are a number of cations that may be present in zeolite L, it is preferred to synthesize the potassium and potassium-sodium forms of the zeolite, i.e., the form in which the exchangeable cations present are substantially all potassium or potassium and sodium ions. The reactants accordingly employed are readily available and generally water soluble. The exchangeable cations present in the zeolite may then conveniently be replaced by other exchangeable cations.

The potassium or potassium-sodium forms of zeolite L may be prepared by preparing an aqueous metal aluminosilicate mixture having a composition, expressed in terms of mole ratios of oxides falling within the following range:

$K_2O/(K_2O+Na_2O)$ _____ From about 0.33 to about 1.
$(K_2O+Na_2O)/SiO_2$ _____ From about 0.4 to about 0.5.
$SiO_2/Al_2O_3$ _____ From about 15 to about 28.
$H_2O/(K_2O+Na_2O)$ _____ From about 15 to about 41.

maintaining the mixture at a temperature of about 100° C. until crystallization occurs, and separating the crystals from the mother liquor.

The chemical formula for zeolite D may be written, in terms of oxides, as follows:

$$0.9 \pm 0.2 [x\text{Na}_2\text{O} : (1-x)\text{K}_2\text{O}] : \text{Al}_2\text{O}_3 : w\text{SiO}_2 : y\text{H}_2\text{O}$$

wherein "$x$" is a value from 0 to 1, "$w$" is from about 4.5 to about 4.9, and "$y$," in the fully hydrated form, is about 7. In the preferred form of zeolite $d$, "$x$" is in the range of from 0.4 to 0.6.

Zeolite D has an X-ray powder diffraction pattern substantially like that shown in Table E.

TABLE E

*X-ray diffraction patterns of zeolite D*

[$d$=interplanar spacing in A.: I/I max.=relative intensity]

| Zeolite D | |
|---|---|
| $d$, A. | I/I max. |
| 9.42 | 66 |
| 6.89 | 67 |
| 5.54 | 15 |
| 5.03 | 62 |
| 4.33 | 62 |
| 3.98 | 27 |
| 3.89 | 23 |
| 3.60 | 12 |
| 3.45 | 39 |
| 3.19 | 15 |
| 2.94 | 100 |
| 2.69 | 9 |
| 2.61 | 38 |
| 2.30 | 16 |
| 2.09 | 22 |
| 1.81 | 29 |
| 1.73 | 23 |

Zeolite D may be prepared as follows:

A sodium-potassium aluminosilicate-water mixture is prepared such that the initial composition of the reactant mixture in terms of oxide-mole-ratios is:

$$\frac{\text{Na}_2\text{O} + \text{K}_2\text{O}}{\text{SiO}_2} = 0.45 \text{ to } 0.65$$

$$\frac{\text{Na}_2\text{O}}{\text{Na}_2\text{O} + \text{K}_2\text{O}} = 0.74 \text{ to } 0.92$$

$$\frac{\text{SiO}_2}{\text{Al}_2\text{O}_3} = \text{about } 28$$

$$\frac{\text{H}_2\text{O}}{\text{Na}_2\text{O} + \text{K}_2\text{O}} = 18 \text{ to } 45$$

The mixture is maintained at a temperature within the range of about 100° C. to 120° C. until crystals are formed; the crystals are then separated from the mother liquor.

The chemical formula for zeolite R may be written as:

$$0.9 \pm 0.2 \, \text{Na}_2\text{O} : \text{Al}_2\text{O}_3 : W\text{SiO}_2 : X\text{H}_2\text{O}$$

wherein "$W$" is from 3.45 to 3.65, and "$X$," for the fully hydrated form, is about 7.

Zeolite R has an X-ray powder diffraction pattern substantially like that shown in Table F.

TABLE F

*X-ray diffraction patterns of zeolite R*

[$d$=interplanar spacing in A.: I/I max.=relative intensity]

| Zeolite R | |
|---|---|
| $d$, A. | 100 (I/I max.) |
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 |

Zeolite R may be prepared as follows:

A sodium aluminosilicate-water mixture is prepared such that the initial composition of the reactant mixture, in terms of oxide-mole-ratios, falls within any one of the following seven ranges:

| | I | II | III | IV | V | VI | VII |
|---|---|---|---|---|---|---|---|
| Na$_2$O/SiO$_2$ | 0.20 to 0.40 | 0.41 to 0.60 | 0.61 to 0.80 | 0.81 to 1.0 | 0.81 to 1.0 | 1.7 to 1.9 | 1.2 to 1.4 |
| SiO$_2$/Al$_2$O$_3$ | about 4 | 3.5 to 6.0 | 3.5 to 6.5 | 3 to 4.5 | about 30 | 10 to 25 | about 6 |
| H$_2$O/Na$_2$O | 22 to 60 | 30 to 60 | 40 to 80 | 40 to 80 | 50 to 60 | 60 to 70 | 80 to 90 |

The mixture is maintained at a temperature within the range of about 100° C. to 120° C. until crystals are formed; the crystals are then separated from the mother liquor.

The chemical formula for zeolite S may be written as:

$$0.9 \pm 0.2 \, \text{Na}_2\text{O} : \text{Al}_2\text{O}_3 : W\text{SiO}_2 : X\text{H}_2\text{O}$$

wherein "$W$" is from 4.6 to 5.9 and "$X$," for the fully hydrated form, is from about 6 to 7.

Zeolite S has a characteristic X-ray powder diffraction pattern which may be employed to identify zeolite S. The X-ray powder diffraction data are shown in Table G.

TABLE G

*X-ray diffraction patterns of synthetic zeolite S*

[$d$=interplanar spacing in A.: I/I max.=relative intensity]

| $d$, A. | 100 (I/I max.) |
|---|---|
| 11.88 | 77 |
| 7.73 | 19 |
| 7.16 | 100 |
| 5.96 | 9 |
| 5.03 | 72 |
| 4.50 | 46 |
| 4.12 | 79 |
| 3.97 | 20 |
| 3.44 | 62 |
| 3.305 | 13 |
| 3.236 | 23 |
| 2.973 | 80 |
| 2.858 | 47 |
| 2.693 | 19 |
| 2.603 | 39 |
| 2.126 | 11 |
| 2.089 | 39 |
| 1.910 | 12 |
| 1.809 | 40 |
| 1.722 | 32 |

Zeolite S may be prepared by preparing a sodium aluminosilicate-water mixture such that the composition of the reactant mixture, in terms of oxide-mole-ratios, falls within the following range when the source of silica is an aqueous colloidal silica sol:

| | |
|---|---|
| $Na_2O/SiO_2$ | 0.3 to 0.6 |
| $SiO_2/Al_2O_3$ | 6 to 10 |
| $H_2O/Na_2O$ | 20 to 100 | and falls within the following range when the source of silica is sodium silicate:

| | |
|---|---|
| $Na_2O/SiO_2$ | About 0.5 |
| $SiO_2/Al_2O_3$ | About 25 |
| $H_2O/Na_2O$ | About 18 | maintaining the mixture at a temperature in the range of from about 80° C. up to about 120° C., preferably at about 100° C., and at a pressure at least equal to the vapor pressure of water in equilibrium with the mixture of reactants until crystals are formed, and separating the crystals from the mother liquor.

The chemical formula for zeolite T may be written, in terms of mole ratios of oxides, as follows:

$$1.1 \pm 0.4[xNa_2O:(1-x)K_2O]:Al_2O_3:6.9 \pm 0.5SiO_2:yH_2O$$

wherein "$x$" may be any value from about 0.1 to about 0.8, and "$y$" may be any value from about 0 to about 8. Zeolite T may be identified and distinguished from other zeolites, and other crystalline substances, by its X-ray powder diffraction pattern. The data which are set forth below in Table H are for a typical example of zeolite T.

TABLE H

| Bragg Angle, $2\theta$ | Interplanar Spacing, $d$ (A.) | Relative Intensity, 100 $I/I_0$ |
|---|---|---|
| 7.72 | 11.45 | 100 |
| 9.63 | 9.18 | 4 |
| 11.74 | 7.54 | 13 |
| 13.35 | 6.63 | 54 |
| 14.74 | 6.01 | 2 |
| 15.44 | 5.74 | 6 |
| 17.78 | 4.99 | 2 |
| 19.43 | 4.57 | 8 |
| 20.46 | 4.34 | 45 |
| 21.35 | 4.16 | 3 |
| 21.78 | 4.08 | 2 |
| 23.27 | 3.82 | 16 |
| 23.64 | 3.76 | 56 |
| 24.28 | 3.67 | 1 |
| 24.82 | 3.59 | 30 |
| 26.04 | 3.42 | 2 |
| 26.92 | 3.31 | 16 |
| 28.04 | 3.18 | 12 |
| 28.29 | 3.15 | 18 |
| 30.47 | 2.93 | 11 |
| 31.15 | 2.87 | 38 |
| 31.38 | 2.85 | 45 |
| 33.41 | 2.68 | 11 |
| 34.32 | 2.61 | 2 |
| 35.83 | 2.51 | 8 |
| 36.09 | 2.49 | 13 |
| 39.26 | 2.30 | 2 |
| 40.81 | 2.21 | 6 |
| 42.61 | 2.12 | 5 |
| 43.33 | 2.09 | 3 |
| 45.58 | 1.99 | 2 |
| 46.30 | 1.96 | 2 |
| 48.17 | 1.89 | 8 |
| 48.84 | 1.86 | 2 |
| 49.61 | 1.84 | 4 |
| 51.44 | 1.78 | 8 |
| 51.58 | 1.77 | 5 |
| 52.29 | 1.75 | 2 |
| 53.68 | 1.71 | 3 |
| 55.40 | 1.66 | 9 |
| 58.03 | 1.59 | 5 |
| 60.82 | 1.52 | 1 |
| 61.48 | 1.51 | 2 |
| 63.29 | 1.47 | 3 |
| 66.24 | 1.41 | 1 |
| 67.65 | 1.38 | 3 |

Zeolite T may be prepared by preparing an aqueous sodium-potassium aluminosilicate mixture having a composition, expressed in terms of mole ratios of oxides, falling within the following range:

| | |
|---|---|
| $Na_2O/(Na_2O+K_2O)$ | From about 0.7 to about 0.8. |
| $(Na_2O+K_2O)/SiO_2$ | From about 0.4 to about 0.5. |
| $SiO_2/Al_2O_3$ | About 20 to 28. |
| $H_2O/(Na_2O+K_2O)$ | About 40 to 42. | maintaining the mixture at a temperature of about 100° C. until crystallization occurs, and separating the crystals from the mother liquor.

To prepare the elemental metal-containing zeolitic molecular sieves by the process of the present invention, it is first necessary to activate the zeolitic molecular sieves, i.e., to drive off substantially all of the contained water. This may be accomplished by heating the zeolitic molecular sieves up to a temperature of about 350° C. in a flowing stream of inert dry gas or in a vacuum. The activated molecular sieve is then ready to receive the alkali metal vapors.

The activated zeolitic molecular sieves and the alkali metal vapors may be brought into contact with each other by mixing molten metal and the molecular sieves, by vaporizing the metal in the presence of the molecular sieves, or by entraining the metal vapors in an inert gas and passing the metal vapor-containing gas stream through a bed of the molecular sieves.

In an example of the invention, 29 grams of activated sodium zeolite X were heated to 125° C. Four grams of metallic sodium were added with stirring in a nitrogen atmosphere. The sodium (melting point 97.5° C.) melted and dispersed evenly throughout the sodium zeolite X, yielding a product with a jet black color. X-ray diffraction showed no destruction of the sodium zeolite X crystal structure.

In another example of the invention, 100 grams of activated sodium zeolite X were charged to a flask and heated to 200° C. Lithium metal in ribbon form was added in small portions of about .3 to about .4 gram with continuous stirring of the mixture until about 3 grams of lithium had been added in a period of about 2½ hours. The stirring was continued for an additional hour. The X-ray diffraction data for the gray colored product indicated that the crystal structure of sodium zeolite X was retained. The product was added to water and a gas, apparently hydrogen, was evolved.

Many advantages accrue from the use of alkali metal-loaded zeolitic molecular sieves that are not available with other materials. For example, it is well known that the alkali metals are good catalysts for the polymerization of olefins. However, by employing alkali metal-loaded zeolitic molecular sieves as catalysts it is possible to selectively polymerize specific olefins from a mixture of olefins, e.g., short straight-chain olefins may be selectively polymerized from admixture with more complex branch-chained olefins, without the necessity for first isolating the components of the mixture.

Similarly, alkali metals have been recognized as good getters for oxygen and other gases. However, the alkali metal-loaded zeolitic molecular sieves may be employed for selective gettering, without contamination of the system being so treated.

Still another advantage of employing the product of the present invention resides in the manner in which the metal is held in the molecular sieve. Catalysts consisting of alkali metals on a catalyst support usually have the problem that the metal tends to migrate in the catalyst bed with a corresponding tendency for the metal to collect in some areas of the bed leaving other areas metal deficient. This tends to decrease the active metal surface available for catalysis and to give non-uniformity of catalysis through the bed. By incorporating the metals on the inside of the zeolitic molecular sieves, the tendency for the metal to migrate is minimized with a corresponding increase in the efficiency of catalysis.

By incorporating the alkali metals in the zeolitic molecular sieves in accordance with the present invention, a suitable means for adding these metals to other chemical systems is provided. By adding the alkali metals in this form, it is possible to control the reactivity of the metals to a much greater extent than is possible by direct addition of the metals to the same chemical systems.

Still another use and advantage found for alkali metal-loaded zeolitic molecular sieves is found in the preparation of zeolitic molecular sieves loaded with the reactive refractory metals of groups IV, V, and VI of the periodic table. A halide of one of these reactive refractory metals may be intimately mixed with an alkali metal-loaded zeolitic molecular sieve, whereupon some of the halide will be adsorbed. The adsorbed halide reacts with the alkali metal present inside the molecular sieve to deposit the reactive refractory metal also inside the molecular sieve. This may be illustrated by the following example.

Fifty grams of activated sodium zeolite X were placed in a flask and heated to 125° C. in argon. Then 6 grams of lump sodium were added with stirring and after dispersion in the zeolite, 12.4 grams of titanium tetrachloride was added slowly with continued stirring. After reaction was complete the material contained 6.2 percent titanium metal.

To further illustrate the utility of the materials of the present invention zeolite X containing sodium amalgam was employed to remove diborane from diborane-contaminated silane.

In preparing the adsorbent bed, about 17 grams of sodium zeolite X were placed in a glass tube to form a zeolite column 9 cm. long and 20 mm. in diameter. About 0.26 gram of sodium were placed in a tube connecting to the zeolite column. The zeolite thus prepared was surrounded by a furnace and heated for about 16 hours at 370–400° C. under vacuum to remove adsorbed water.

The furnace was then lowered to surround both the zeolite and the sodium containing tube. The temperature of the system eventually stabilized at about 500° C. in the sodium zone and slightly higher in the zeolite zone, during this additional heating period of about 16 hours the furnace was kept at about 450–500° C.

About 1.3 grams of mercury were next placed in the bottom of the zeolite column and heated at 100–150° C. under vacuum. The mercury vapor thus emitted entered the zeolite bed to form a sodium amalgam within the porous structure thereof.

In preparing the gaseous mixture to be purified, silane and diborane were added to a container so that the partial pressure of silane was about 158 mm. of mercury, and that of the diborane about 64 mm. of mercury. This gaseous mixture was passed through the above prepared sodium amalgam-containing zeolite bed.

The flow of gas having passed through the zeolite bed was then collected, measured, and found to have a vapor pressure of 152 mm. of mercury which was substantially that of the silane starting pressure thereby indicating the diborane was quantitatively removed.

As used herein the term "activation" is employed to designate the removal of water from the zeolitic molecular sieves, i.e., dehydration, and does not refer to catalytic activity. The zeolitic molecular sieves containing the elemental metal exhibit catalytic activity.

The products of the present invention have a surface area about four times that expected with most alumina, silica or aluminosilicate supported metals thereby providing a greater surface area available for reaction. Since the external surface of the molecular sieve represents less than 1 percent of the total surface area it may be seen that there is an extremely large area available for chemisorption and catalysis in the internal portion of the molecular sieve. Since this region is available only through pores of molecular size it may be seen that selective chemisorption and catalysis may be obtained in a system containing a mixture of molecules some of which are too large to enter the pores whereas others are capable of entering the pores.

Zeolite A is described and claimed in U.S. Patent No. 2,882,243, issued April 14, 1959, to R. M. Milton.

Zeolite D is described and claimed in U.S. patent application Serial No. 680,383, filed August 26, 1957.

Zeolite L is described and claimed in U.S. patent application Serial No. 711,565, filed January 28, 1958.

Zeolite R is described and claimed in U.S. patent application Serial No. 680,381, filed August 26, 1957.

Zeolite S is described and claimed in U.S. patent application Serial No. 724,843, filed March 31, 1958.

Zeolite T is described and claimed in U.S. patent application Serial No. 733,819, filed May 8, 1958, now U.S. Patent No. 2,950,952.

Zeolite X is described and claimed in U.S. Patent No. 2,882,244, issued April 14, 1959 to R. M. Milton.

Zeolite Y is described and claimed in U.S. patent application Serial No. 728,057, filed April 14, 1958.

The metal-containing synthetic zeolites A, X, and Y, and natural zeolite faujasite have been found to be most satisfactory and useful for the purposes of the present invention.

Erionite is a naturally occurring zeolite, described originally by Eakle, Am. J. Science (4), 6, 66 (1898). It is most readily identified by its characteristic X-ray powder diffraction pattern. The $d$-spacings, in A, and relative intensities thereof, obtained on a well-crystallized specimen are tabulated below.

*X-ray powder data, erionite*

| $d$-spacing, A. | Relative Intensity, $I/I_0 \times 100$ |
| --- | --- |
| 11.38 | 100 |
| 9.06 | 10 |
| 7.50 | 10 |
| 6.56 | 40 |
| 6.24 | 10 |
| 5.68 | 10 |
| 5.34 | 10 |
| 4.56 | 10 |
| 4.31 | 40 |
| 4.15 | 20 |
| 3.80 | 20 |
| 3.74 | 40 |
| 3.58 | 30 |
| 3.30 | 10 |
| 3.27 | 10 |
| 3.20 | 10 |
| 3.16 | 10 |
| 3.14 | 10 |
| 3.00 | 5 |
| 2.92 | 5 |
| 2.86 | 30 |
| 2.83 | 30 |
| 2.805 | 20 |
| 2.67 | 10 |
| 2.59 | 5 |
| 2.49 | 10 |
| 2.47 | 10 |
| 2.20 | 5 |
| 2.11 | 5 |
| 1.88 | 5 |
| 1.83 | 5 |
| 1.77 | 10 |
| 1.65 | 10 |

What is claimed is:

1. As a new composition of matter a dehydrated rigid, three-dimensional, crystalline metal aluminosilicate zeolite of the molecular sieve type capable of adsorbing oxygen internally at the normal boiling point of oxygen containing at least one elemental alkali metal in the inner adsorption region.

2. A composition of matter in accordance with claim 1 wherein said alkali metal is sodium.

3. A composition of matter in accordance with claim 1 wherein said alkali metal is lithium.

4. A process for preparing an elemental alkali metal-loaded rigid, three-dimensional, crystalline metal aluminosilicate zeolite of the molecular sieve type which comprises dehydrating a rigid, three-dimensional, crystalline metal aluminosilicate zeolite of the molecular sieve type capable of adsorbing oxygen internally at the normal boiling point of oxygen whereby substantially all of the water of hydration of said crystalline metal aluminosilicate zeolite of the molecular sieve type is removed; intimately contacting in an inert atmosphere said dehydrated crystalline metal aluminosilicate zeolite of the molecular sieve type with the vapor of at least one elemental alkali metal, the temperature of said vapor being below the temperature of crystal destruction for said crystalline metal aluminosilicate zeolite of the molecular sieve type, whereby said metal vapor is adsorbed by said dehydrated crystalline metal aluminosilicate zeolite of the molecular sieve type; and cooling said dehydrated crystalline metal aluminosilicate zeolite of the molecular sieve type containing said adsorbed metal vapor in an inert atmosphere whereby said adsorbed elemental metal is retained in the inner adsorption region of said crystalline metal aluminosilicate zeolite of the molecular sieve type.

5. A process for preparing an elemental sodium-containing rigid, three-dimensional, crystalline metal aluminosilicate zeolite of the molecular sieve type which comprises dehydrating a rigid, three-dimensional, crystalline metal aluminosilicate zeolite of the molecular sieve type capable of adsorbing oxygen internally at the normal boiling point of oxygen whereby substantially all of the water of hydration of said crystalline metal aluminosilicate zeolite of the molecular sieve type is removed; intimately contacting in an inert atmosphere said dehydrated crystalline metal aluminosilicate zeolite of the molecular sieve type with molten sodium metal at a temperature below the temperature of destruction of the crystalline metal aluminosilicate zeolite of the molecular sieve type crystal whereby sodium vapors are adsorbed by said dehydrated crystalline metal aluminosilicate zeolite of the molecular sieve type; and cooling in an inert atmosphere said dehydrated crystalline metal aluminosilicate zeolite of the molecular sieve type containing said adsorbed sodium vapor whereby elemental sodium is retained in the inner adsorption region of said dehydrated crystalline metal aluminosilicate zeolite of the molecular sieve type.

6. A process for preparing an elemental lithium-containing rigid, three-dimensional crystalline metal aluminosilicate zeolite of the molecular sieve type which comprises dehydrating a rigid, three-dimensional, crystalline metal aluminosilicate zeolite of the molecular sieve type capable of adsorbing dehydrating oxygen internally at the normal boiling point of oxygen whereby substantially all of the water of hydration of said crystalline metal aluminosilicate zeolite of the molecular sieve type is removed; intimately contacting in an inert atmosphere said dehydrated crystalline metal aluminosilicate zeolite of the molecular sieve type with molten lithium metal at a temperature below the temperature of destruction of the crystalline metal aluminosilicate zeolite of the molecular sieve type crystal whereby lithium vapors are adsorbed by said dehydrated crystalline metal aluminosilicate zeolite of the molecular sieve type; and cooling in an inert atmosphere said dehydrated crystalline metal aluminosilicate zeolite of the molecular sieve type containing said adsorbed lithium vapor whereby elemental lithium is retained in the inner adsorption region of said dehydrated crystalline metal aluminosilicate zeolite of the molecular sieve type.

7. As a new composition of matter dehydrated rigid three-dimensional crystalline metal aluminosilicate zeolite of the molecular sieve type chosen from the group consisting of zeolite A, zeolite D, zeolite L, zeolite R, zeolite S, zeolite T, zeolite X, zeolite Y, chabazite, faujasite, erionite, mordenite, gmelinite and the calcium form of analcite containing at least one elemental alkali metal in the inner adsorption region.

8. A composition of matter as described in claim 7 wherein the rigid three-dimensional crystalline metal aluminosilicate zeolite of the molecular sieve type is zeolite A.

9. A composition of matter as described in claim 7 wherein the rigid three-dimensional crystalline metal aluminosilicate zeolite of the molecular sieve type is zeolite X.

10. A process for preparing an elemental alkali-metal-loaded rigid three-dimensional crystalline metal aluminosilicate zeolite of the molecular sieve type which comprises dehydrating a rigid three-dimensional crystalline metal aluminosilicate zeolite of the molecular sieve type chosen from the group consisting of zeolite A, zeolite D, zeolite L, zeolite R, zeolite S, zeolite T, zeolite X, zeolite Y, chabazite, faujasite, erionite, mordenite, gmelinite and the calcium form of analcite whereby substantially all of the water of hydration of said crystalline metal aluminosilicate zeolite of the molecular sieve type is removed; intimately contacting in an inert atmosphere said dehydrated crystalline metal aluminosilicate zeolite of the molecular sieve type with the vapor of at least one alkali metal, the temperature of said vapor being below the temperature of crystal destruction for said crystalline metal aluminosilicate zeolite of the molecular sieve type, whereby said metal vapor is adsorbed by said dehydrated crystalline metal aluminosilicate zeolite of the molecular sieve type; and cooling said dehydrated crystalline metal aluminosilicate zeolite of the molecular sieve type containing said adsorbed metal vapor in an inert atmosphere whereby said adsorbed elemental alkali metal is retained in the inner adsorption region of said crystalline metal aluminosilicate zeolite of the molecular sieve type.

11. A process as described in claim 10 wherein the rigid three dimensional crystalline metal aluminosilicate is zeolite A.

12. A process as described in claim 10 wherein the rigid three dimensional crystalline metal aluminosilicate is zeolite X.

References Cited in the file of this patent

UNITED STATES PATENTS

| | | |
|---|---|---|
| 1,840,450 | Jaeger et al. | Jan. 12, 1932 |
| 2,306,610 | Barrer | Dec. 29, 1942 |
| 2,413,134 | Barrer | Dec. 24, 1946 |
| 2,617,712 | Bond | Nov. 11, 1952 |
| 2,859,257 | Hess | Nov. 4, 1958 |
| 2,882,243 | Milton | Apr. 14, 1959 |
| 2,882,244 | Milton | Apr. 14, 1959 |